I. W. COX.
TEA AND COFFEE POT.
APPLICATION FILED FEB. 19, 1913. RENEWED MAR. 9, 1916.
1,196,086.
Patented Aug. 29, 1916.
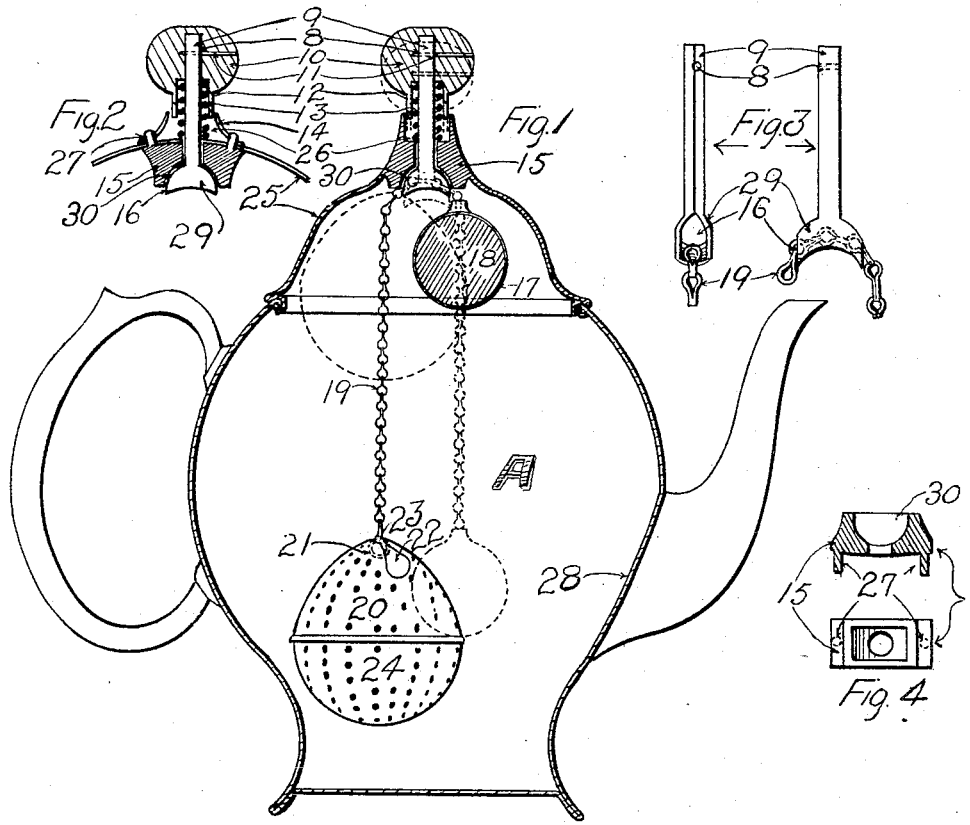
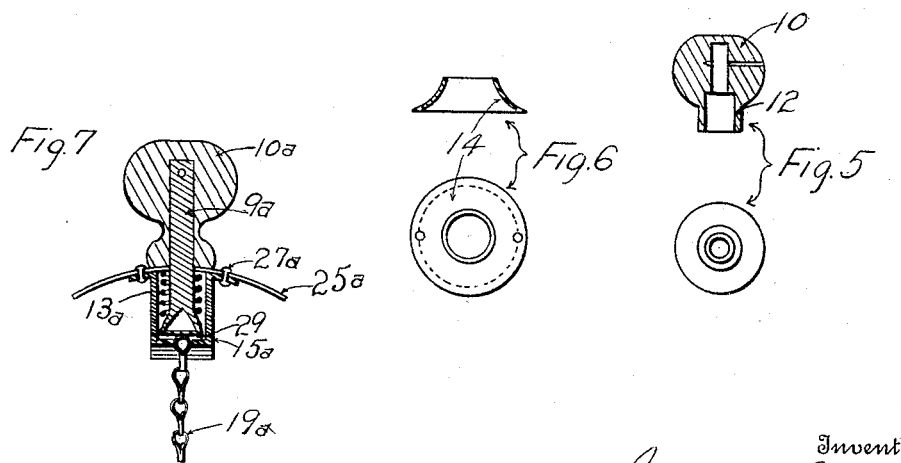
Witnesses
Clarita Walter
Marian N. Pierce
Inventor
Irvin W. Cox

UNITED STATES PATENT OFFICE.

IRWIN W. COX, OF WASHINGTON, DISTRICT OF COLUMBIA.

TEA AND COFFEE POT.

1,196,086.  Specification of Letters Patent.  Patented Aug. 29, 1916.

Application filed February 19, 1913, Serial No. 749,529. Renewed March 9, 1916. Serial No. 83,175.

*To all whom it may concern:*

Be it known that I, IRWIN W. Cox, a citizen of the United States, residing in Washington, in the District of Columbia, have invented certain new and useful Improvements in Tea and Coffee Pots, of which the following is a specification.

In the use of pots for making beverages, where the material for making the beverage is put directly into the liquid, it is necessary to provide a strainer over the mouth of the spout. In providing this strainer, recesses are generally formed which accumulate sediment and are very difficult to clean, because of the inaccessibility of these recesses. My invention obviates this difficulty by removing the necessity for such a strainer, by providing the pot with a device for suspending the material of which the beverage is to be made in a receptacle hereinafter called a "tea ball."

The present invention has for its object, among other things, the provision of new and novel means for suspending a tea ball in a tea or coffee pot.

A further object of the invention is to provide a suspending device for a tea ball whereby the tea ball may be automatically removed from the liquid in the pot.

The invention also contemplates a suspending device that is neat in appearance and compact and that is substantially hidden from view, thereby not marring the design of the pot.

Another object is the provision of a suspending device having the tea ball removable therefrom so that the tea ball may be conveniently cleaned and charged.

Still another object, is the provision of a suspending device that is simple in construction and operation and one which may be manufactured at a reasonable cost.

Other objects and advantages will appear from the accompanying drawings and specifications, which for the purpose of illustration show a preferred form of the invention and in which:

Figure 1 is a vertical section of a pot through the center thereof showing certain parts in side elevation. Fig. 2 is a view similar to Fig. 1 showing the device as attached to the cover of an ordinary tea, coffee, or other pot. Fig. 3 shows two enlarged views of certain details. Fig. 4 is a central section and plan of the modified form of bearing block shown in Fig. 2. Fig. 5 is a detail of the knob in central section and inverted plan. Fig. 6 shows the washer used with the device as shown in Fig. 2. Fig. 7 is a vertical section of a modified form of the device.

The same reference numerals refer to like parts throughout the several views.

A represents the body of a tea or coffee pot to which the invention is applied. This pot may be constructed in any desired shape and of any suitable material, it being understood that the shape of the pot or the material of which it is made is not essential to the present invention. The pot A is provided with a suitable supporting member or cover 25. In the present preferred form of the invention the suspending device for the tea ball is shown as attached to this supporting member or cover although it is obvious that it might be attached to other parts of the pot if desired. Attached to the cover 25 is a bearing block 15 which may be formed integral with the cover as shown in Fig. 1, or attached thereto by any suitable securing means such as shown for example in Fig. 2. The bearing block is centrally perforated and is countersunk on the lower side. Mounted on the bearing block is a handle or knob 10 which serves as a knob for the cover and as an operating handle for the tea ball suspension device. The knob 10 is provided with a hollow shank 12 which fits into the hole 26 of the cover, which hole is formed by countersinking the top of the block in Fig. 1, and is formed in Fig. 2 by use of the washer 14. Passing through the perforation in the bearing block 15 is a plunger rod 9 which is fixed to the knob 10 in any suitable manner and forms an extension thereof. As shown, the knob is provided with a hole to receive the rod and a rivet 11 is used to prevent the knob from turning on or moving separate from the plunger rod. The hole in the knob is preferably not extended entirely therethrough, although it is evident it might be so extended, if desired. The lower end of the rod 9 is enlarged so as to form a yoke-shaped head 29 which fits into a corresponding recess or counter-sink 30 in the bearing block 15. This bearing block is provided with a hole 16 which forms a run-way for a chain, hereinafter described.

Surrounding the rod 9 and mounted between the bearing block 15 and the knob 10 is a coil spring 13, which is normally under compression therefore forcing the knob 10 upward and thereby holding the enlarged head 29 of rod 9 in engagement with the counter-sink in block 15. The spring 13, is mounted in the hollow space in the shank of the knob 10, and the recess 26, in the block 15 and since the shank 12, extends into the recess 26, the spring 13, is concealed. This construction serves to keep the working parts out of sight.

Passing through the hole or runway 16, in the yoke-shaped head is a chain or other suitable suspension cord 19. The chain is clamped between the head 29, of the rod 9, and the edges of the recess 30, of the bearing block 15, by means of spring 13, which normally exerts a continual pressure upon the rod 9, and the head 29, tending to force the head 29, into the recess 30 and to clamp the chain between the head and recess. But by pressing upon the knob 10, the head 29, is moved away from the block 15, and the pressure upon the chain is thereby released so that it can be moved through the hole or runway 16, in the head. When the pressure upon the knob 10, is removed the spring forces the head 29, into the counter-sink 30 again and clamps the chain in place. The chain may thus be clamped near one end or at any desired intermediate position. To one end of the chain 19, is fixed a gravity ball or counter-balancing weight 18, of any suitable material. As shown in the drawing the ball is composed of an outer shell 17, of acid resisting material such as aluminum which is filled with a suitable heavy material. Removably attached to the other end of the chain is a tea ball composed of two perforated cup shaped members 20, and 24, which are united together at their edges by any well known means. The means for removably attaching the tea ball to the chain comprises an enlargement 21, on the end of the chain or cord which enlargement engages a key-hole bayonet slot 22—23, in the upper cup 20, of the tea ball. This attachment allows the tea ball to be conveniently removed for cleaning and charging.

The operation of the device is as follows: The tea ball is charged in the usual manner and attached to the chain 19, by means of the bayonet-slot connection. Pressure upon the chain 19, is relieved by pressing upon the knob 10, and the chain is adjusted so that the gravity ball 18, is in its uppermost position as shown in full in Fig. 1. The lid is then placed upon the pot and the tea ball hangs in the lower portion of the pot in contact with the liquid therein. When it is desired to remove the tea ball from the liquid the knob is pressed downward, thereby relieving the pressure on the chain 19, which in turn allows the gravity ball 18, to pull the tea ball out of the liquid.

Fig. 2 shows the same general form of device as illustrated in Fig. 1 applied to any common form of receptacle lid. This form of the device differs only in the shape of the bearing block 15, and its method of attachment to the cover and also the method of forming the recess 26. The bearing block 15, of Fig. 2, is provided with projections 27, which pass through suitable holes in the cover 25, and through alined holes in the washer 14, to hold the parts together. In place of the integral rivets 27, screws, separate rivets, or other suitable fastening means might be employed. The device can by this means be attached to a common receptacle lid by simply removing the old knob and drilling holes for the rivets 27, and riveting the device in place.

In the modified form shown in Fig. 7 the parts are altered so that the device is operated by pulling up, on the knob, instead of pushing upon it. A stirrup $15^a$ is riveted to the cover $25^a$ by suitable rivets $27^a$. The chain $19^a$ passes over the lower portion of the stirrup $15^a$ and is clamped in position by the enlarged end of rod $9^a$ which is normally held against the chain by the pressure exerted by the spring $13^a$ interposed between the cover $25^a$ and the enlarged end or rod $9^a$. In order to relieve the pressure on the chain $19^a$ it is necessary to pull up on the knob $10^a$ to move the rod $9^a$ out of engagement with chain $19^a$. By means of this form of device, all the working parts are mounted upon the inside of the cover and the cover therefore presents the appearance of the ordinary cover.

It will be seen that the structure of the present invention is one in which there are no exposed parts on the outside of the tea or coffee pot except the operating handle or knob, and that the tea ball itself together with its raising mechanism, including the flexible chain or cord and its support or runway and the clamping and releasing mechanism, are all within the pot, and in the preferred form of the invention are all carried by the cover member and removable with this member. When the operating handle or knob of the cover is also the operating handle which clamps and releases the tea ball raising mechanism, this knob has a double function, while in appearance the cover and knob are much the same as those of the ordinary pot. There are thus no unsightly projections on the outside of the pot, and no complicated and expensive operating mechanism. In the forms shown in Figs. 1 and 2 the tea ball operating mechanism is released when the knob is depressed. Movement of the tea ball is thus prevented when the cover is raised, and the chain is all the more tightly clamped in place. In the modification of Fig. 7 the raising of the cover by the knob will release the chain and permit the tea ball to be raised if the weight of the cover is sufficient to overcome the clamping action of the spring, or the knob may be raised without raising the tea ball if the clamping action of the spring is not overcome by the weight of the cover or by pressing down on the cover. It will also be seen that the present invention provides a self-raising or automatically raised tea ball attachment adapted to be used with any ordinary tea or coffee pot, either in connection with its own cover or in place of such cover.

By using a counterbalancing weight connected to the tea ball by a flexible chain and supporting and releasably clamping said chain near the top of the pot, the raising of the tea ball can be easily arrested at any desired intermediate position. The raising of the tea ball from its lowered position by the counterbalancing weight when the chain is unclamped and released will be gradual, and slower or faster depending on the difference in weight between the tea ball and its operating counterbalance. It is sometimes desirable to raise the tea ball only part way at first, and also to arrange the tea ball in different positions in the liquid, or at different positions when the liquid has different depths, or when the attachment is used on larger or smaller pots. This is made possible in the attachment of the present invention, since the flexible chain can be clamped at any particular desired intermediate position, and raised a little at a time or all at once.

While I have used the term "chain" in referring to the flexible connection between the tea ball and weight, yet I consider a flexible cord or connection as the equivalent thereof for purposes of the present invention.

Although a specific and preferable embodiment of my invention has been shown and described it is understood that the invention is not limited to the mechanical structure shown but contemplates such changes as may come within the spirit of the appended claims.

I claim:

1. An attachment for tea pots and similar receptacles comprising a tea ball, a counterbalancing weight, a flexible chain connecting said tea ball and weight, and means for supporting and releasably clamping said chain near the top of said pot.

2. A cover attachment for tea pots and similar receptacles comprising a cover member, a tea ball, a counterbalancing weight, a flexible chain connecting said tea ball and weight, and means carried by said cover member for supporting and releasably clamping said chain.

3. A cover attachment for tea pots and similar receptacles comprising a cover having a knob, a tea ball, a counterbalancing weight, a flexible chain connecting said tea ball and weight, and means controllable by said knob for supporting and releasably clamping said chain.

4. An attachment for tea pots and similar receptacles comprising an operating knob, attaching means for movably attaching said knob to such receptacles, a raising device arranged to permit lowering of the tea ball from said knob and tending normally when released to raise said tea ball, and said knob and attaching means being arranged normally to support and hold said tea ball in adjusted position and to permit raising of said tea ball when desired.

5. An attachment for tea pots and similar receptacles comprising a cover member, a knob for lifting said cover member, a tea ball, a raising device permitting lowering of the tea ball from said cover and tending normally when released to raise said tea ball, and said knob being arranged normally to hold said tea ball in adjusted position and to permit raising of said tea ball when desired.

6. An attachment for tea pots and similar receptacles comprising a bearing block adapted to be mounted upon such receptacles, a movable knob having an extension projecting through said bearing block, a chain arranged to be clamped between said extension and said bearing block and having a tea ball on one end and a counterbalancing weight on the other, a spring arranged between said knob and bearing block for normally holding said chain clamped between the said block and extension, and said knob being movable against said spring to unclamp said chain.

7. An attachment for tea pots and similar receptacles comprising a removable cover member, a bearing block on said member, a knob having an extension projecting through said cover member and block, a chain movably supported in said knob extension and passing between a part of said extension and the block, a spring between the knob and the block for binding the chain between the knob extension and the bearing block, a tea ball on one end of said chain, means attached to the other end of the chain for moving said chain, said knob and extension being movable to release said chain to allow movement thereof by the moving means.

8. A tea or coffee pot comprising in combination, a pot, a cover therefor, a single movable knob for lifting said cover, a tea ball, and means within said pot whereby when said knob is moved inwardly said tea ball is automatically raised in said pot.

9. A tea or coffee pot comprising in combination, a pot, a cover therefor, a single movable knob for lifting said cover, a tea ball, suspending means for said tea ball, actuating means for said suspending means, and means within said pot whereby when said knob is moved inwardly said suspending means is released to allow said actuating means to move the same.

IRWIN W. COX.

Witnesses:
R. S. STUNZ,
M. N. PIERCE.

Copies of this patent may be obtained for five cents each, by addressing the "Commissioner of Patents, Washington, D. C."